US008108901B2

(12) United States Patent  (10) Patent No.: US 8,108,901 B2
Nicas et al.  (45) Date of Patent: Jan. 31, 2012

(54) MANAGING ACCESS TO HIGH DEFINITION CONTENT

(75) Inventors: Nicholas A. Nicas, Blue Springs, MO (US); Douglas R. Medina, Grain Valley, MO (US); Brian Wilson, Liberty, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 683 days.

(21) Appl. No.: 12/201,924

(22) Filed: Aug. 29, 2008

(65) Prior Publication Data

US 2010/0058400 A1    Mar. 4, 2010

(51) Int. Cl.
  *H04N 5/545*  (2006.01)
  *H04N 7/173*  (2011.01)
(52) U.S. Cl. .............. 725/100; 725/55; 725/58; 725/91; 725/98
(58) Field of Classification Search .................... 725/42, 725/58, 91, 98, 100, 114, 135
See application file for complete search history.

(56) References Cited

U.S. PATENT DOCUMENTS

| 7,617,515 B1* | 11/2009 | Laksono ................... 725/93 |
| 2003/0145323 A1* | 7/2003 | Hendricks et al. ........... 725/34 |
| 2006/0037083 A1 | 2/2006 | Kortum et al. |
| 2006/0209906 A1 | 9/2006 | Dabrowa |
| 2006/0215650 A1 | 9/2006 | Wollmershauser et al. |
| 2008/0201748 A1* | 8/2008 | Hasek et al. ............... 725/98 |
| 2010/0095337 A1* | 4/2010 | Dua ......................... 725/110 |

* cited by examiner

*Primary Examiner* — Kieu Oanh T Bui
(74) *Attorney, Agent, or Firm* — Jackson Walker L.L.P.

(57) ABSTRACT

A system and method for managing access to high definition (HD) content includes a master customer premises equipment (CPE) device enabled for prioritizing conflicting requests for HD content based on predefined priority settings associated with a plurality of client CPE devices. Access to HD content by the client CPE devices may be associated with a token and conflicting requests may be resolved in favor of the client CPE device that holds the token. Disclosed systems permit administrators to control the use of limited resources within a location by limiting access to the limited resources by secondary users.

18 Claims, 3 Drawing Sheets

MANAGING ACCESS TO HIGH DEFINITION CONTENT

BACKGROUND

1. Field of the Disclosure

The disclosed subject matter generally relates to multimedia content provider networks and more particularly to managing access to Internet protocol television (IPTV) high definition content.

2. Description of the Related Art

Multimedia content provider networks may only provide a limited number of high definition streams to a single location. In some cases, high definitions streams may be delivered to multiple customer premises equipment (CPE) devices on a first come, first served basis.

DESCRIPTION OF THE EMBODIMENT(S)

Figure 1:
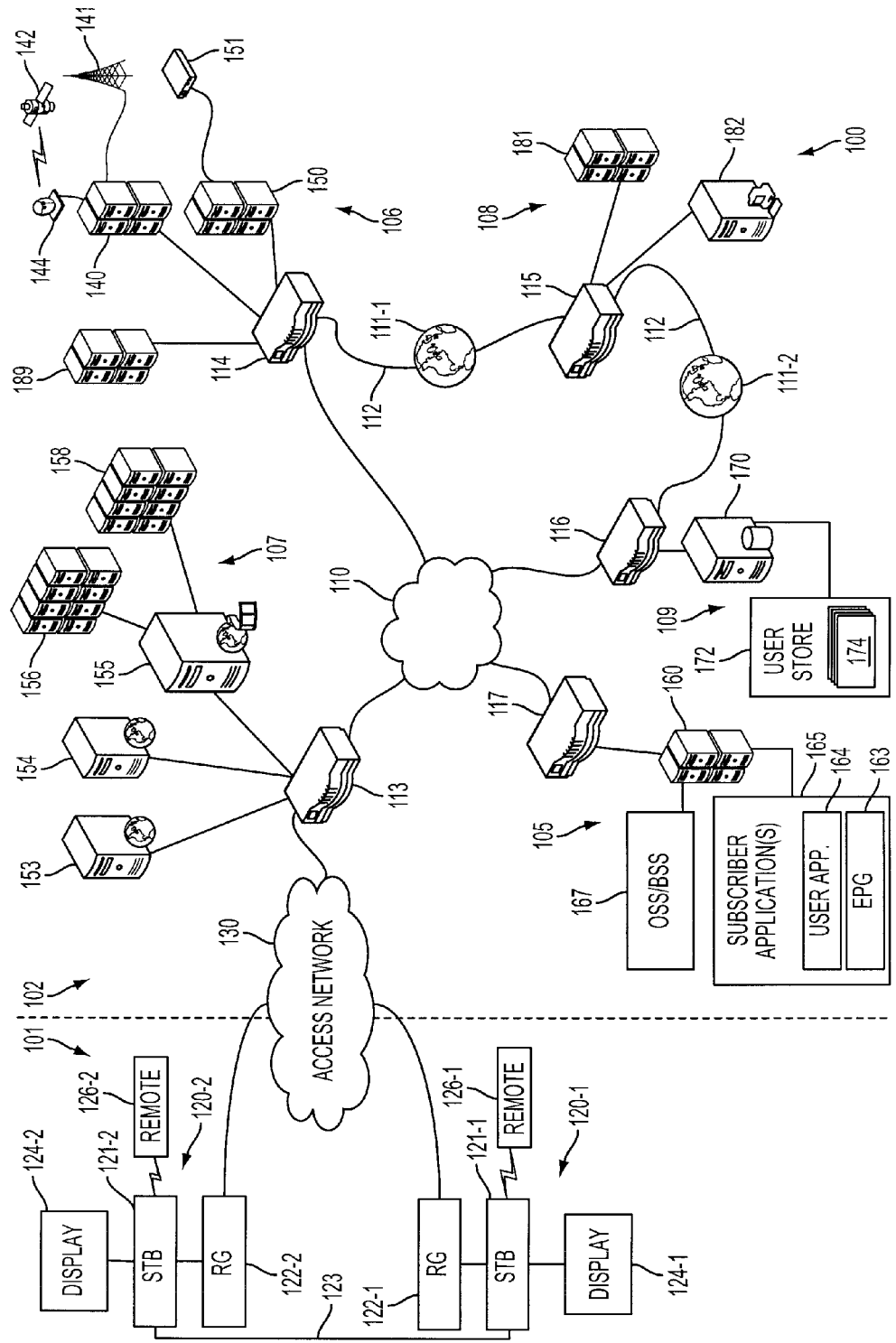
FIG. 1 illustrates a representative IPTV architecture for managing access to high definition content in accordance with disclosed embodiments.

In one aspect, a system for managing access to high definition content includes a master CPE device that prioritizes conflicting CPE requests for high definition content based on predefined priority settings associated with the plurality of CPE devices in communication with the master CPE device. In some embodiments, the priority settings are based on user input that may be received from a graphical user interface presented on a digital television display. The CPE device may be a digital television set-top box (STB), for example. Accessing the high definition content may be associated with a token, and conflicting requests to access the high definition content from client CPE devices are resolved in favor of the client CPE device that holds the token. In some embodiments, the client CPE device that holds the token is a further digital television STB.

In still another aspect, a computer program product includes instructions for designating one of a plurality of CPE devices as a master CPE device, allocating priority to a select one of a plurality of high definition streams for playing or recording to the master CPE device, permitting a client CPE device to select one of the high definition streams for playing or recording when a master CPE device is not selecting one of the high definition streams, and interrupting the playing or recording of the high definition streams selected by the client CPE device upon the master CPE device selecting one of the high definition streams. In some embodiments, further instructions notify a user of the client CPE device regarding the interruption. Further instructions prompt a user of the master CPE device to indicate whether the client CPE device has permission to play or record the high definition stream selected by the master CPE device. Further instructions may provide the user of the client CPE device an option for playing or recording the high definition stream selected by the master CPE device.

In another aspect, a disclosed method includes enabling a user to designate one of a plurality of CPE devices as a master CPE device, resolving conflicting requests for playing or recording the high definition streams to the master CPE device, and granting a client CPE device request to play or record the high definition streams if the master CPE device does not request to play or record the high definition streams. Upon the master CPE requesting to play or record a high definition stream, playing or recording by the client CPE is interrupted and the master CPE is provided access to the high definition stream. In some embodiments, the method includes designating one CPE device as the master CPE device based on presence information or other information indicative of an operational status of the CPE devices. For example, the information may be indicative of whether the designated master CPE device is powered ON. In response to detecting that the designated master CPE device is not powered ON, the method may include providing several CPE devices with access to the high definition streams on a first come, first served basis.

In yet another aspect, a service is disclosed for prioritizing a plurality of CPE devices associated with a single subscriber. The service includes enabling a user to assign priority values to the plurality of CPE devices and resolving conflicting CPE requests for multimedia content based at least in part on the priority values. In some embodiments, resolving conflicting requests includes resolving requests for N different items of multimedia content where N exceeds a predetermined threshold. The service may include enabling a user to assign priority values, and in some cases, the user may assign a high priority value to a single CPE device and assign a low priority value to other CPE devices.

Live television content, pay-per-view content, video on-demand (VOD) content, and applications are from a multimedia content provider network to a user's CPE devices such as a residential gateway (RG), an STB, or some combination of such devices. In typical IPTV networks, each household is provisioned with a maximum amount of network bandwidth based on the capacity of the provider network. Stream management limits the number of streams that can be delivered to users' homes to prevent the users from exceeding their available bandwidth. In some networks, all households are provisioned with a fixed number of standard definition (SD) streams and a fixed number of high definition (HD) streams. For example, each household or other location may be provisioned with three SD streams and one HD stream. For networks that contain more bandwidth, more HD streams may be provisioned, for example each household or location may be provisioned with two SD streams and two HD streams. In such systems, a user can receive four streams simultaneously, but only two of them can be HD. Typically, streams are allocated to a household and not to specific receivers. Therefore, it is possible for a single receiver to consume multiple streams. In some provider networks, there may only be one digital video recorder (DVR) receiver allowed per household. In these cases, DVR receivers may be enabled to play, pause, and record live streams and play recorded programs. In contrast, non-DVR receivers in such networks may only watch live streams. In some networks, streams are prioritized user input and granted, from highest to lowest priority, to DVR recording, VOD/help-on-demand content, and live TV. Stream priorities are used when a stream conflict occurs to determine if there are streams available for interruption. Interruption typically occurs automatically, with no options displayed, when a function with a higher priority (e.g., DVR recording) is requested. For example, interruption of watching live television would automatically occur when a scheduled recording is started. Interrupt options may appear when there are conflicts of functions that have the same priority. If the user runs into a stream conflict, the user may be presented with an on-screen message indicating that all television services are in use. Such messages may be presented with a list of selectable options to handle the conflicts. For example, a user that uses a network that is provisioned with three SD streams and one HD stream may experience a stream conflict if receivers in the user's household attempt to record five television shows at once. Similarly, a stream conflict would occur if receivers in the user's household access five different live television shows at the same time or establish a combination of recording and watching live TV that adds up to more than four separate streams. In addition, attempting to watch and record more than one HD stream would result in a stream conflict, if only one HD stream were available to the user by the network. In some systems, DVR playback does not count as a stream because it occurs locally from storage within a receiver that includes the DVR playback functionality. In some cases, multiple receivers may tune to the same channel (e.g., a channel being recorded or watched live) without using an additional stream.

When all streams are being used for recording or VOD programs for example, a user that attempts to access an additional stream may be presented with a user interface that informs the user of the conflict. For example, a user may be presented with a user interface that tells the user that all television services are in use and that to proceed with the content selected by the user, the user may have to stop a recording or power OFF another TV receiver. If a stream conflict occurs when all streams are being used, but the streams are not all being used for recording, for VOD programs, or for other high-priority applications, a user may choose from several options that are presented by a television network during the stream conflict. For example, a user may be presented with an option that all television services are in use, and that to proceed, the user either needs to stop the recording, power OFF another TV receiver or interrupt another TV. A user that chooses to interrupt service to another television for example, may be presented with an interrupt confirmation panel that allows the user to select which television stream (e.g., a high definition stream) will be interrupted. Alternatively, the lowest prioritized stream may be interrupted automatically. Accordingly, upon interruption an interrupt screen may appear on the television that has had its stream taken. When a receiver is interrupted, it may display a screen that informs the user that the receiver was interrupted to allow operation of a higher priority function (e.g., DVR recording). If other channels are available to the user whose television was interrupted, a receiver or television may provide the user with options for retuning to the available streams. If the user attempts to watch television content or perform another low priority function and all streams are being used for recording, for VOD, or for other high priority functions, the user may choose from several options including viewing recorded television or trying again to retune to a previous channel, as examples.

In accordance with disclosed embodiments, users are provided the ability to designate a master receiver (e.g., a master IPTV STB) for acquiring and managing a limited number of HD content streams within a household or other location. Disclosed embodiments permit an administrator the ability to override the utilization of HD content streams by other users at the location. A master IPTV STB or other CPE device, when so configured by an administrator, does not permit other users in the home to access the HD limited resources such as any HD streams that are then currently being watched or accessed by the master CPE device. An administrator may add an access code through the use of a graphical user interface or menu to allow any STB or other CPE device in a location to be converted to a master CPE device. In some systems, a user may be required to enter an access code to access one or more HD streams or other limited resources. Accordingly, systems may be set up so that only an administrator's CPE device has rights to take control of HD streams. In some embodiments, an administrator can control other users' access to HD content or can deny other users from accessing HD content entirely. In some cases this would limit such users to accessing only SD content, for example. In some systems, only a limited number of HD streams are available, and the limited number of HD streams are only usable by a master CPE, for example, that acquires the signal and does not share it. In other words, if a primary user (i.e., the user of a master CPE) is accessing and watching an HD program other users may not be able to access the same stream. However, in accordance with some disclosed embodiments, a secondary user (i.e., a user of a client CPE device) may request permission from the primary user (e.g., an administrator) for permission to view the HD program In some cases, such access to limited resources may be gained by the secondary user entering an administrator definable code that permits the secondary user to login or otherwise present credentials. In some cases, a client CPE device locks-in to an HD stream received by a master CPE device and in response to channel changes by the primary user, corresponding channel changes occur for the secondary user.

In some disclosed systems options may be added to a graphical user interface to enable an administrator to force content by entering a user definable administrative security code, for example. Such functionality may provide the administrator with the ability to control and lock how HD streams are allocated. Secondary users that do not have administrator rights may have their ability to access HD content restricted in the event that the primary user requests HD definition content. In some embodiments, an administrator or other primary user is enabled to provide user input to a master CPE that results in a denial of access by other users to HD content and HD streams.

In the following description, examples are set forth with sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral refers to a specific instance of an element and an un-hyphenated form of the reference numeral refers to the element generically or collectively. Thus, for example, element 121-1 refers to an instance of an STB, which may be referred to collectively as STBs 121 and any one of which may be referred to generically as an STB 121. Before describing other details of embodied methods and devices, selected aspects of multimedia content provider networks that provide multimedia programs are described to provide further context.

Television programs, VOD movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within a STB, television, or other form of receiver is required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with CPE including, for example, a digital subscriber line (DSL) modem in communication with an STB, a display, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view, advanced programming information (e.g., sophisticated and customizable electronic programming guides (EPGs)), and the like. Bidirectional networks may also enable a service provider to collect information related to a user's preferences, whether for purposes of providing preference based features to the user, providing potentially valuable information to service providers, or providing potentially lucrative information to content providers and others.

Referring now to the drawings, FIG. 1 illustrates selected aspects of a multimedia content distribution network (MCDN) 100 for controlling access to HD content and other limited resources in accordance with disclosed embodiments. MCDN 100, as shown, is a multimedia content provider network that may be generally divided into a client side 101 and a service provider side 102 (a.k.a. server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include varying ratios of twisted pair copper cables and fiber optics cables. In a fiber to the curb (FTTC) access network, the last mile portion that employs copper is generally less than approximately 300 miles in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. The OSS/BSS switch 115 is coupled to an OSS/BSS server 181 that hosts operations support services including remote management via a management server 182. In addition to providing routing/switching functionality, switches 113 through 117 preferably include hardware or firmware firewalls, not depicted, that maintain the security and privacy of network 110. Other portions of MCDN 100 may communicate over a public network 112, including, for example, Internet or other type of web-network where the public network 112 is signified in FIG. 1 by the World Wide Web icons 111.

As shown in FIG. 1, client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

As shown in FIG. 1, RG 122 may include elements of a broadband modem such as a DSL or cable modem, as well as elements of a firewall, router, and/or access point for an Ethernet or other suitable local area network (LAN) 123. In this embodiment, STB 121 is a uniquely addressable Ethernet compliant device. In some embodiments, display 124 may be any National Television System Committee (NTSC) and/or Phase Alternating Line (PAL) compliant display device. Both STB 121 and display 124 may include any form of conventional frequency tuner. Remote control device 126 communicates wirelessly with STB 121 using infrared (IR) or RF signaling. STB 121-1 and STB 121-2, as shown, may communicate through LAN 123 in accordance with disclosed embodiments to select multimedia programs for viewing.

In IPTV compliant implementations of MCDN 100, clients 120 are configured to receive packet-based multimedia streams from access network 130 and process the streams for presentation on displays 124. In addition, clients 120 are network-aware resources that may facilitate bidirectional-networked communications with server side 102 resources to support network hosted services and features. Because clients 120 are configured to process multimedia content streams while simultaneously supporting more traditional web-like communications, clients 120 may support or comply with a variety of different types of network protocols including streaming protocols such as real-time transport protocol (RTP) over user datagram protocol/internet protocol (UDP/IP) as well as web protocols such as hypertext transport protocol (HTTP) over transport control protocol (TCP/IP).

The server side 102 of MCDN 100 as depicted in FIG. 1 emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture downlinked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. As shown, live acquisition server 140 is communicatively coupled to an encoder which, prior to transmission, encodes acquired content using for example, MPEG-2, H.263, MPEG-4, H.264, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to STB 121 indicating a request for the particular channel. When STB 121 responds to the remote control signal, the STB 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, RTP, real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188-byte transport packets. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information (i.e., user information) for STB 121, for example, because it is connected to an unauthorized local loop or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that provides administrative rights to selected users to allow for the provisioning of a CPE device as a master CPE device that manages access to HD content and other limited resources by client CPE devices. User application 164, as illustrated in FIG. 1, emphasizes the ability to extend the network's capabilities by implementing a network-hosted application. Because the application resides on the network, it generally does not impose any significant requirements or imply any substantial modifications to client 120 including STB 121. In some instances, an STB 121 may require knowledge of a network address associated with user application 164, but STB 121 and the other components of client 120 are largely unaffected.

As shown in FIG. 1, a database switch 116 as connected to applications switch 117 provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

As shown, STB 121-1 is a master CPE enabled for prioritizing conflicting CPE requests for high definition content based on predefined priority settings associated with STBs 121-1 and 121-2. STB 121-2 is a client CPE device that has a lower priority than STB 121-1 regarding access to limited resources such as HD streams. In some embodiments, access to HD content may be associated with a token, and conflicting requests for the HD content from client CPE devices such as STB 121-2 and other CPE devices that have equivalent priority settings may be resolved in favor of the client CPE device that holds the token. As the master CPE device, STB 121-1 provides the token to STB 121-2, to itself, or any other client CPE device having priority. When a master CPE device (e.g., 121-1) appropriates access to the HD content for itself, the client CPE devices (e.g., 121-2) may have access to the same high definition content as the master CPE. If STB 121-1, as the master CPE device, and STB 121-2, as the client CPE device, receive HD content substantially simultaneously, upon a channel change by STB 121-1, a corresponding channel change may automatically occur for STB 121-2, assuming that STB 121-1 has granted permission to STB 121-2 to receive HD content as it is received by STB 121-1. This may occur if STB 121-1 is receiving HD content at the same time that the user of STB 121-2 requests high definition content, but only a limited number of streams are available and are being used by STBs with a higher priority than STB 121-2. As shown in FIG. 1, STB 121-2, as the client CPE device, may be enabled to become a master CPE device upon the receipt of administrator credentials from a user of STB 121-2. This permits an administrator, for example a parent, to always have priority over HD content (e.g., streams) regardless of which STB from a plurality of STBs in a home are used by the administrator. STB 121-1, as the master CPE device, is enabled in some embodiments to appropriate access to HD content for itself if a client CPE device such as 121-2 has access to the high definition content when the master CPE device (i.e., 121-1) seeks access.

As shown, MCDN 100 is enabled for providing a service for prioritizing a plurality of CPE devices (e.g., STBs 121)

associated with a single subscriber. The service includes enabling a user to assign priority values to a plurality of CPE devices. For example, an administrator such as a parent may assign the highest priority value to STB 121-1 and may assign a lower priority value to STB 121-2. The service further includes resolving conflicting CPE requests for multimedia content based on the assigned priority values. Accordingly, if the user of STB 121-1 requests a HD stream and the number of HD streams are limited, the HD stream will be taken from STB 121-2 if necessary to support the request from the user of STB 121-1. In some cases, the service includes resolving conflicting requests for N different items of multimedia content when N exceeds a predetermined threshold (e.g., one). Each of the requests for multimedia content may be for HD content.

Figure 2:
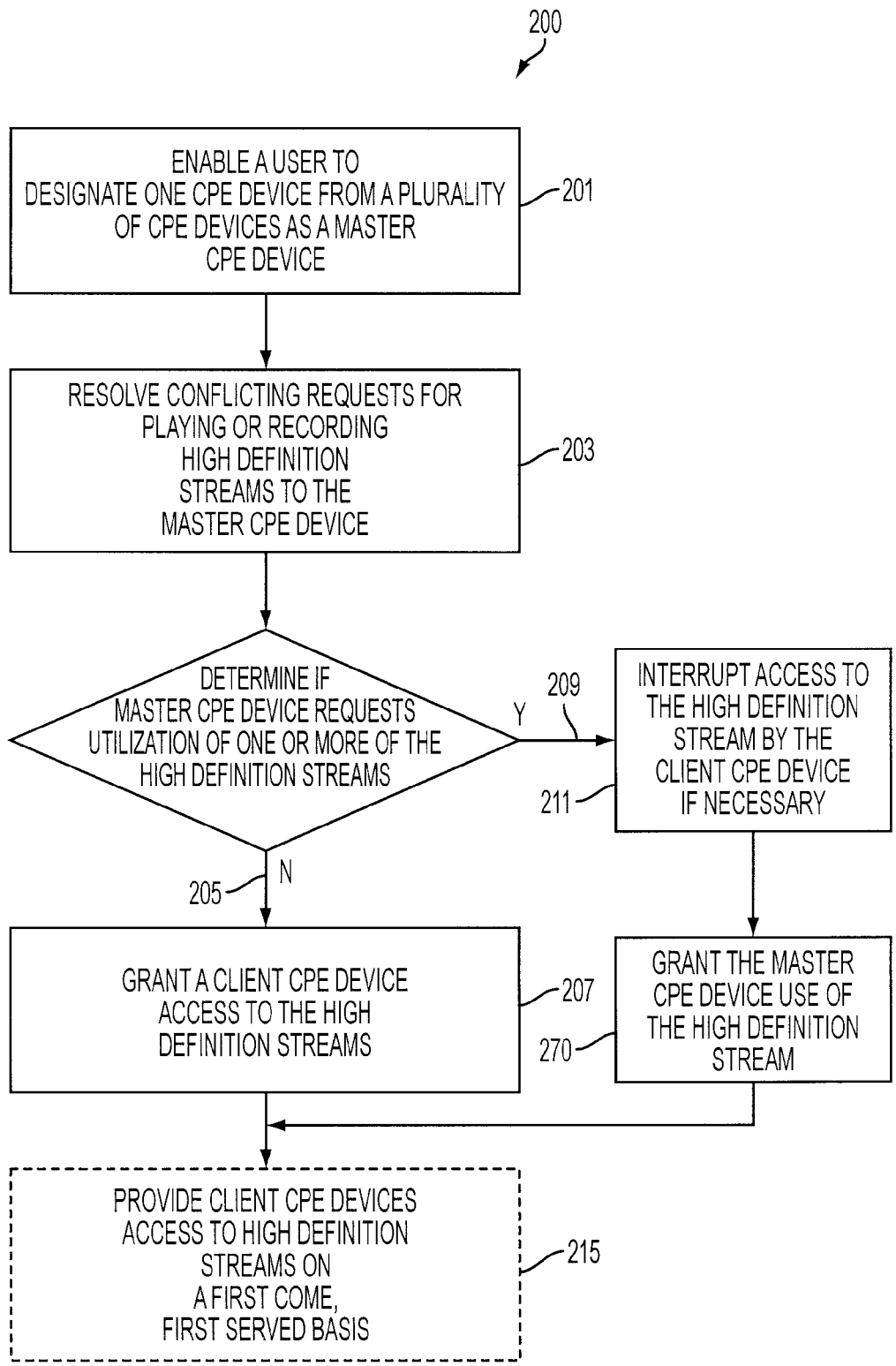
FIG. 2 illustrates selected operations in a methodology for managing access to high definition content in accordance with disclosed embodiments.

FIG. 2 depicts selected operations of methodology 200 for managing access to HD content in accordance with disclosed embodiments. As shown, methodology 200 includes enabling (operation 201) a user to designate one of a plurality of CPE devices as a master CPE device. Designating a CPE device as the master CPE device may be at least partly based on presence information indicative of an operational status of the CPE devices. For example, the presence information may indicate whether a predesignated master CPE device is powered ON. Conflicting requests for playing or recording HD streams are resolved (operation 203) in favor of the master CPE device. If the master CPE device does not request (operation 205) to play or record a HD stream, the client CPE device is granted (operation 207) one of the HD streams. If the master CPE device does request (operation 209) to play or record a HD stream, the master CPR device is granted (operation 270) use of the multimedia stream for playing or recording the HD stream by the client CPE device is interrupted (operation 211). As shown, methodology 200 may include, in response to detecting that the designated master CPE device is not powered ON, providing (operation 215) a plurality of CPE devices with access to HD streams on a first come, first served basis.

Figure 3:
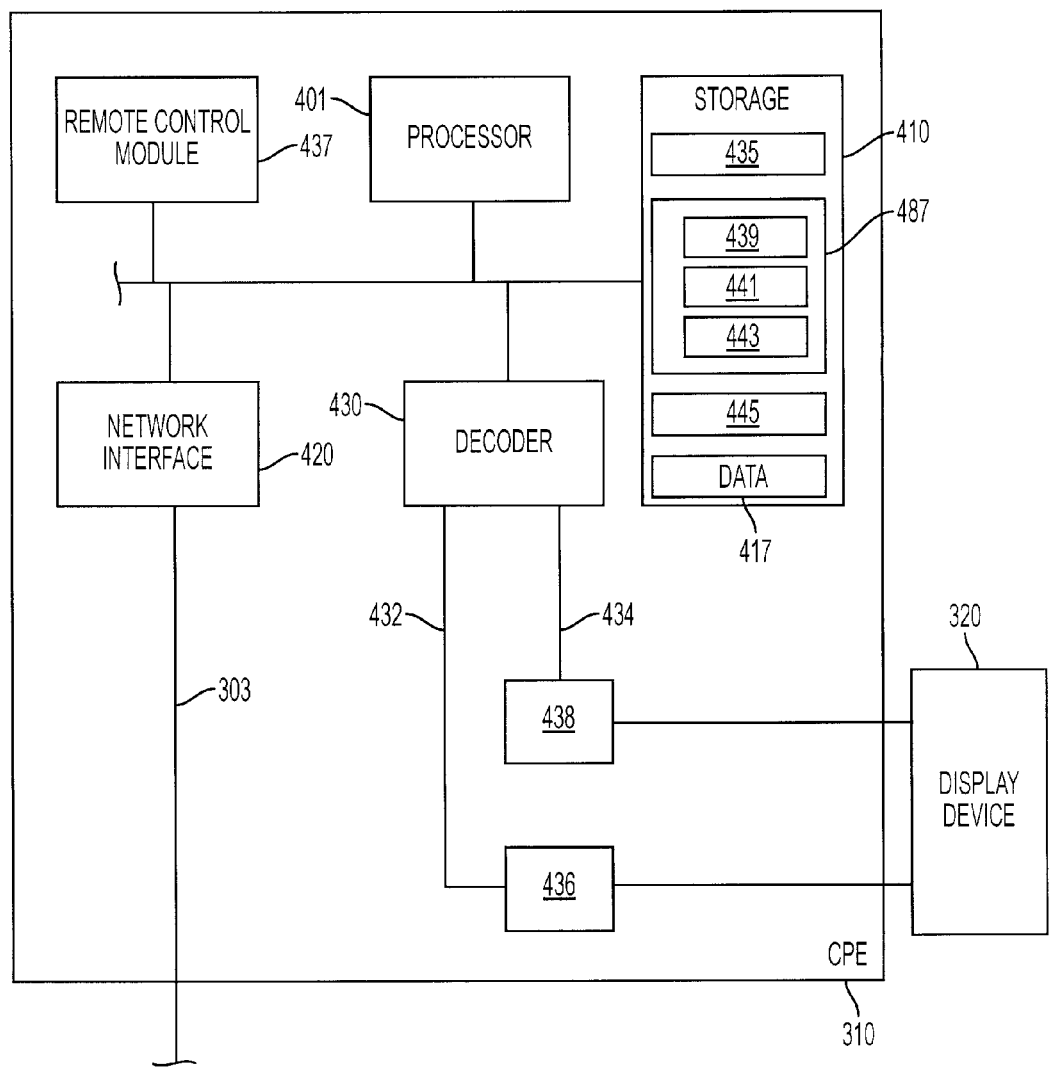
FIG. 3 illustrates a CPE device for use with disclosed embodiments to manage access to high definition content.

Referring now to FIG. 3, a block diagram illustrates selected elements of an embodiment of CPE 310. CPE 310 may be an STB or other localized equipment for providing a user with access in usable form to multimedia content such as digital television programs. The multimedia content may be provided over a limited number of streams. As shown, CPE 310 includes a processor 401 and general purpose storage 410 connected to a shared bus. A network interface 420 enables CPE 310 to communicate with LAN 303 (e.g., LAN 123 from FIG. 1). Network interface 420 may also be adapted for receiving information from remote hardware devices such as remote STBs. For example, CPE device 310 may be enabled as a master CPE device and may receive requests and may send information over network interface 420 to client CPE devices within a location. An integrated audio/video decoder 430 generates native format audio signals 432 and video signals 434. Signals 432 and 434 are encoded and converted to analog signals by digital-to-analog (DAC)/encoders 436 and 438. The output of DAC/encoders 436 and 438 is suitable for delivering to an NTSC, PAL, or other type of display device 320. General purpose storage 410 includes non-volatile memory 435, main memory 445, and drive unit 487. As shown, drive unit 487 includes prioritization module 439, notification module 441, and token module 443. Data 417 may include priority preferences for a plurality of CPE.

As shown, CPE device 310 is a master CPE device enabled for prioritizing conflicting CPE requests for HD content based on predefined priority settings. Drive unit 436 includes tangible computer readable media and has stored instructions that are accessible by processor 401. Prioritization module 439 enables CPE device 310 to designate one of a plurality of CPE devices as a master CPE device. In some embodiments, CPE device 310 designates itself as a master CPE device. Prioritization module 439 includes instructions for allocating to the master CPE device priority to select one of a plurality of high definition streams for playing or recording. Prioritization module 439 includes further instructions for permitting a client CPE device from a plurality of CPE devices to select one of the plurality of HD streams for playing or recording if the master CPE device is not playing or recording using one of the HD streams. Upon the master CPE device selecting one of the HD streams for use, prioritization module 439 interrupts the playing or recording by the client CPE device and notification model 441 provides, for example, an on-screen display for the user of the client CPE device that access to the HD stream has terminated. In some embodiments, notification module 441 may prompt a user of the master CPE device to indicate whether the client CPE device has permission to play or record the HD stream that has been selected by the master CPE device. In this way, the client CPE device may be allowed to lock into content received by the master CPE device. Token module 443 includes instructions for associating a token with an individual stream of a plurality of HD streams. A CPE device that holds the token is recognized by CPE device 310 and other CPE devices as having priority to access individual IPTV HD streams. Token module 443 enables, in some embodiments, CPE device 310 to have supervision authority to allocate tokens to client CPE devices communicatively coupled to CPE device 310 through LAN 303. Remote control model 437 provides operability to CPE device 310 to communicate with a remote control device (not depicted) to allow a user of CPE device 310 to provide user input for granting access to HD streams, for entering administrator credentials, for selecting television content, and for other such activities.

While the disclosed subject matter has been described in connection with one or more embodiments, the disclosed embodiments are not intended to limit the subject matter of the claims to the particular forms set forth. On the contrary, disclosed embodiments are intended to encompass alternatives, modifications, and equivalents.

What is claimed is:

1. A computer program product comprising instructions stored on tangible computer readable media for managing customer premises equipment access to IP television high definition streams, the instructions comprising instructions for:
   designating one of a plurality of customer premises equipment devices as a master customer premises equipment device;
   allocating to the master customer premises equipment device priority to select one of the high definition streams for consuming, wherein consuming is selected from playing and recording;
   permitting a client customer premises equipment device from the plurality of customer premises equipment devices to select one of the high definition streams for consuming when the master customer premises equipment device is not consuming one of the high definition streams; and
   upon the master customer premises equipment device selecting one of the high definition streams, interrupting the consuming of the high definition streams selected by the client customer premises equipment device.

2. The computer program product of claim 1, further comprising instructions for:

notifying a user of the client customer premises equipment device regarding the interruption.

3. The computer program product of claim 2, further comprising instructions for:
prompting a user of the master customer premises equipment device to indicate whether the client customer premises equipment device has permission to consume the high definition stream selected by the master customer premises equipment device.

4. The computer program product of claim 3, further comprising instructions for:
providing the user of the client customer premises equipment device an option for consuming the high definition stream selected by the master customer premises equipment device.

5. The computer program product of claim 1, further comprising instructions for:
associating a token with an individual stream of the IPTV high definition streams, wherein a customer premises equipment device that holds the token is recognized by each of the plurality of client customer premises equipment devices and the master customer premises equipment device as having priority to access the individual IPTV high definition stream; and
providing the master customer premises equipment device with supervision authority to allocate tokens to client customer premises equipment devices.

6. The computer program product of claim 5, wherein the computer readable media is communicatively coupled to a digital television set-top box.

7. The computer program product of claim 6, wherein the master customer premises equipment device is a digital television set-top box.

8. A method of managing access by a plurality of customer premises equipment devices to a number of IP television high definition streams, the method comprising:
enabling a user to designate one of the plurality of customer premises equipment devices as a master customer premises equipment device;
resolving conflicting requests for consuming the high definition streams; wherein consuming a stream is selected from playing the stream and recording the stream;
if the master customer premises equipment device does not request to play or record one of the high definition streams, granting a client customer premises equipment device request to consuming one of the high definition streams; and
upon the master customer premises equipment requesting to consume one of the high definition streams, interrupting the consuming of the high definition stream selected by the client customer premises equipment and permitting consuming of the high definition stream as requested by the master customer premises equipment device.

9. The method of claim 8, wherein designating one customer premises equipment device as the master customer premises equipment device is based at least partially on presence information indicative of an operational status of a portion of the plurality of customer premises equipment devices.

10. The method of claim 9, wherein the presence information is indicative of whether the designated master customer premises equipment device is powered ON.

11. The method of claim 10, wherein in response to detecting that the designated master customer premises equipment device is not powered ON, the method further comprises:
providing the plurality of customer premises equipment devices with access to the number of high definition streams on a first come, first served basis.

12. A application server configured to host a user application, the user application including program instructions, executable by a processor, the program instructions including instructions for:
designating one of a plurality of customer premises equipment devices as a master customer premises equipment device;
allocating to the master customer premises equipment device priority to select one of the high definition streams for consumption, wherein consumption is selected from playing a stream and recording a stream;
permitting a client customer premises equipment device from the plurality of customer premises equipment devices to select one of the high definition streams for consumption when the master customer premises equipment device is not consuming one of the high definition streams; and
upon the master customer premises equipment device selecting one of the high definition streams, interrupting the consuming the high definition streams selected by the client customer premises equipment device.

13. The application server of claim 12, wherein the program instructions include instructions for:
notifying a user of the client customer premises equipment device regarding the interruption.

14. The application server of claim 13, wherein the program instructions include instructions for:
prompting a user of the master customer premises equipment device to indicate whether the client customer premises equipment device has permission to consume the high definition stream selected by the master customer premises equipment device.

15. The application server of claim 14, wherein the program instructions include instructions for:
providing the user of the client customer premises equipment device an option for consuming the high definition stream selected by the master customer premises equipment device.

16. The application server of claim 13, wherein the computer readable media is communicatively coupled to a digital television set-top box.

17. The application server of claim 16, wherein the master customer premises equipment device is a digital television set-top box.

18. The application server of claim 12, wherein the program instructions include instructions for:
associating a token with an individual stream of the IPTV high definition streams, wherein a customer premises equipment device that holds the token is recognized by each of the plurality of client customer premises equipment devices and the master customer premises equipment device as having priority to access the individual IPTV high definition stream; and
providing the master customer premises equipment device with supervision authority to allocate tokens to client customer premises equipment devices.

* * * * *